United States Patent
Vainio et al.

(10) Patent No.: US 8,479,107 B2
(45) Date of Patent: Jul. 2, 2013

(54) METHOD AND APPARATUS FOR FLUID GRAPHICAL USER INTERFACE

(75) Inventors: Janne Vainio, Pirkkala (FI); Janne Bergman, Tampere (FI)

(73) Assignee: Nokia Corporation, Espoo (FI)

( * ) Notice: Subject to any disclaimer, the term of this patent is extended or adjusted under 35 U.S.C. 154(b) by 664 days.

(21) Appl. No.: 12/651,071

(22) Filed: Dec. 31, 2009

(65) Prior Publication Data

US 2011/0161852 A1   Jun. 30, 2011

(51) Int. Cl.
*G06F 3/00* (2006.01)
*G06F 3/048* (2006.01)

(52) U.S. Cl.
USPC ............ 715/762; 715/763; 715/764; 715/767

(58) Field of Classification Search
USPC ........................ 715/762–769, 799, 810, 829
See application file for complete search history.

(56) References Cited

U.S. PATENT DOCUMENTS

| | | | |
|---|---|---|---|
| 5,806,071 A * | 9/1998 | Balderrama et al. ................. 1/1 |
| 7,716,600 B2 * | 5/2010 | Sawano ........................ 715/813 |
| 2002/0093539 A1 * | 7/2002 | Os et al. ......................... 345/810 |
| 2006/0075355 A1 * | 4/2006 | Shiono et al. ................. 715/778 |
| 2006/0107213 A1 | 5/2006 | Kumar et al. |
| 2006/0277500 A1 * | 12/2006 | Sawano ........................ 715/835 |
| 2007/0085829 A1 | 4/2007 | Lin |
| 2007/0124697 A1 * | 5/2007 | Dongelmans ................. 715/805 |
| 2007/0155461 A1 * | 7/2007 | Loewenstein et al. .......... 463/13 |
| 2008/0001924 A1 * | 1/2008 | de los Reyes et al. ........ 345/173 |
| 2008/0155461 A1 | 6/2008 | Ozaki |
| 2008/0229255 A1 | 9/2008 | Linjama et al. |
| 2009/0128500 A1 | 5/2009 | Sinclair |
| 2010/0095219 A1 * | 4/2010 | Stachowiak et al. .......... 715/745 |
| 2011/0078109 A1 * | 3/2011 | Griggs et al. ................. 707/609 |

OTHER PUBLICATIONS

Flickr. Accessed: Mar. 31, 2010, http://www.flickr.com/photos/tags/.
International Search Report and Written Opinion of corresponding PCT Application No. PCT/IB2010/055391 dated Mar. 28, 2011, pp. 1-11.

* cited by examiner

*Primary Examiner* — Tadeese Hailu
(74) *Attorney, Agent, or Firm* — Ditthavong Mori & Steiner, P.C.

(57) ABSTRACT

A method including causing, at least in part, display of selectable objects on a graphical user interface, where each of the selectable objects corresponds to data or an application accessible via the graphical user interface. The method further includes causing, at least in part, display of the selectable objects in motion travelling across the graphical user interface based on a category of the selectable object or context dependent data, and allowing user selection and manipulation of the selectable objects displayed on the graphical user interface.

17 Claims, 14 Drawing Sheets

METHOD AND APPARATUS FOR FLUID GRAPHICAL USER INTERFACE

BACKGROUND

Service providers and device manufacturers are continually challenged to deliver value and convenience to consumers by, for example, providing compelling services and vast array of media and products. Service providers can provide various user interface applications for use on user equipment that enhance the user's interface experience with the user equipment and utilization of the various products and services offered by the service provider. For example, with the ever increasing capabilities of user equipment and large amount of media content that is available today, users can have difficulty utilizing such equipment and searching through the vast amounts of data and application accessible on the user equipment. Currently available user interface applications have limitations and thus fail to provide the user with an interface that can allow for the user to fully appreciate and utilize the various products and services offered by the service provider. In addition to being easy to use and simple, the modern user interface is essential part of entertainment and media consumption, thus it should also provide a playful and enjoyable experience. Strict effectiveness is not the only factor in measuring a good user interface. Combining an easy-to-use and effective user interface with playful and entertaining aspects is a challenging task and there are no obvious and straightforward solutions. In order to provide an answer, a user interface designer has to take into account human behavioral factors.

SOME EXAMPLE EMBODIMENTS

Therefore, there is a need for an approach for providing a fluid graphical user interface. It will combine a clean and simple interface with playful and entertaining factors.

According to one embodiment, a method comprises causing, at least in part, display of selectable objects on a graphical user interface, where each of the selectable objects corresponds to data or an application accessible via the graphical user interface. The method further comprises causing, at least in part, display of the selectable objects in motion travelling across the graphical user interface based on a category of the selectable object or context dependent data, and allowing user selection and manipulation of the selectable objects displayed on the graphical user interface.

According to another embodiment, an apparatus comprising: at least one processor; and at least one memory including computer program code, the at least one memory and the computer program code configured to, with the at least one processor, cause the apparatus to perform at least the following: cause, at least in part, display of selectable objects on a graphical user interface, wherein each of the selectable objects corresponds to data or an application accessible via the graphical user interface; cause, at least in part, display of the selectable objects in motion travelling across the graphical user interface based on a category of the selectable object or context dependent data; and allow user selection and manipulation of the selectable objects displayed on the graphical user interface.

According to another embodiment, a computer-readable storage medium carrying one or more sequences of one or more instructions which, when executed by one or more processors, cause an apparatus to at least perform the following steps: causing, at least in part, display of selectable objects on a graphical user interface, wherein each of the selectable objects corresponds to data or an application accessible via the graphical user interface; causing, at least in part, display of the selectable objects in motion travelling across the graphical user interface based on a category of the selectable object or context dependent data; and allowing user selection and manipulation of the selectable objects displayed on the graphical user interface.

According to another embodiment, an apparatus comprises means for causing, at least in part, display of selectable objects on a graphical user interface, where each of the selectable objects corresponds to data or an application accessible via the graphical user interface. The apparatus further comprises means for causing, at least in part, display of the selectable objects in motion travelling across the graphical user interface based on a category of the selectable object or context dependent data, and means for allowing user selection and manipulation of the selectable objects displayed on the graphical user interface.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a fluid graphical user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to the use thereof on mobile devices such as cellular telephones, it is contemplated that the approach described herein may be used with any other type of user equipment and/or in conjunction with the use of on a server such as a service provider server or any other type of server.

Figure 1:
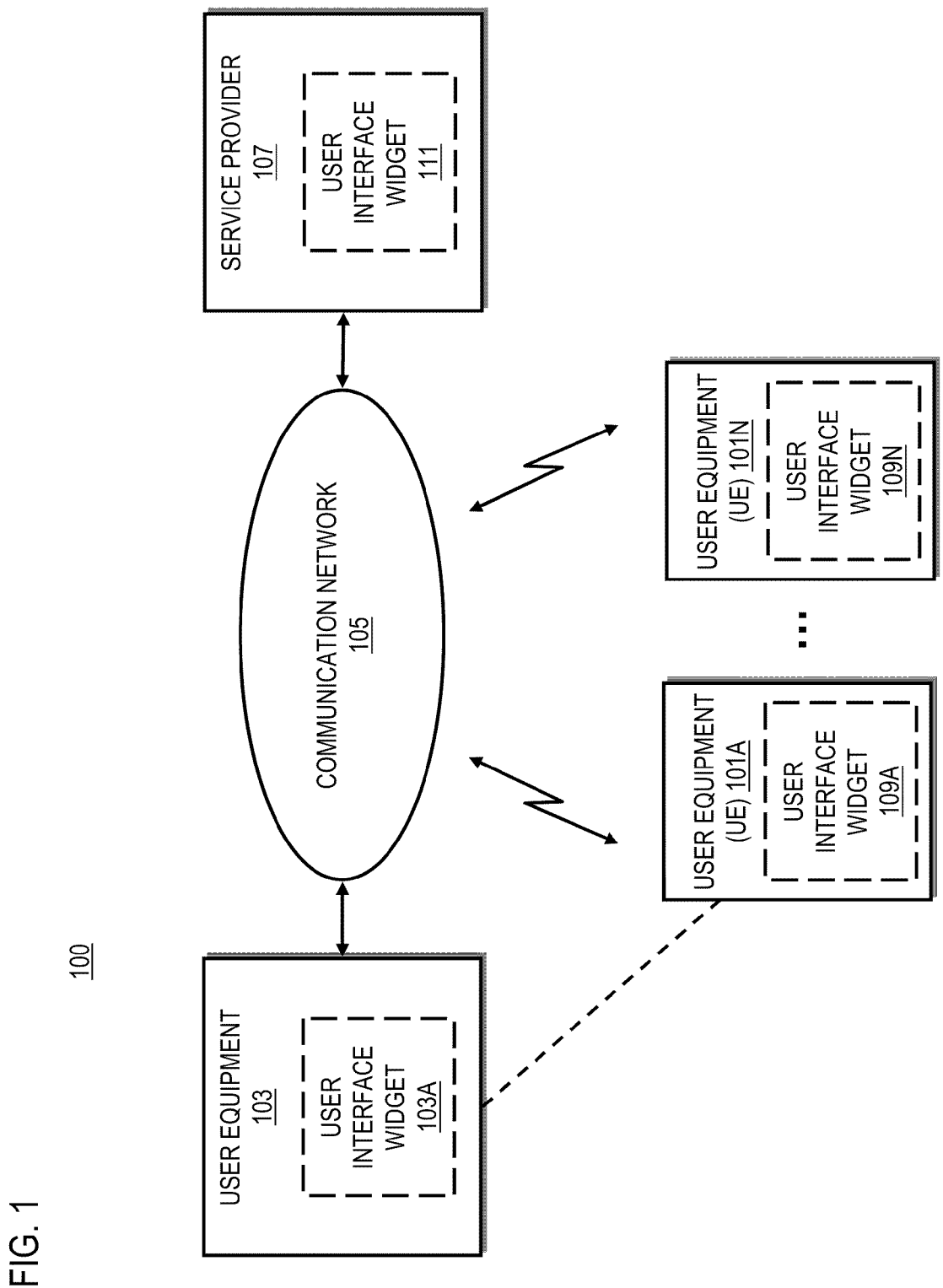
FIG. 1 is a diagram of a system capable of providing a fluid graphical user interface, according to one embodiment.

FIG. 1 is a diagram of a system capable of providing a fluid graphical user interface, according to an embodiment. As shown in FIG. 1, the system 100 comprises user equipment (UE) 101A . . . 101N and 103 having connectivity to a communication network 105. Also a service provider server 107 is provided that is also connected to communication network 105. In this figure, UE 101A . . . UE101N, UE 103, and service provider 107 are each shown as including a user interface widget 109A . . . 109N, 103A, and 111, respectively; however, it is contemplated that such a widget need not be provided in each but rather it could alternatively be provided in one or any combination of more than one such apparatuses. By way of illustration and not limitation, UE 101A could be provided as a mobile device having user interface widget 109A, and such UE 101A could provide the user interface displays described herein without the need for any other user interface widget. Thus, if a user is utilizing the user interface display on UE 101A, the UE 101A can utilize the user interface widget 109A in order to provide such a display, or the user interface widget 103A or the user interface widget 111, or a combination thereof depending on whether the widget is being run locally or remotely. Also, by way of illustration and not limitation, UE 103 is shown as being connected to UE 101A by a dashed line, which can be any form of wireless or wired connection, such as, for example, when a mobile device is connected with a computer for syncing, etc.

By way of example, the communication network 105 of system 100 includes one or more networks such as a data network (not shown), a wireless network (not shown), a telephony network (not shown), short range wireless network (not shown), broadcast network (not shown) or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), wireless LAN (WLAN), Bluetooth® network, Ultra Wide Band (UWB) network, and the like.

The UEs 101A . . . 101N and 103A is any type of mobile terminal, fixed terminal, or portable terminal including a mobile handset, station, unit, device, multimedia computer, multimedia tablet, Internet node, communicator, communication device, desktop computer, laptop computer, Personal Digital Assistants (PDAs), audio/video player, digital still/video camera, game device, analog/digital television broadcast receiver, analog/digital radio broadcast receiver, positioning device, electronic book device, or any combination thereof. It is also contemplated that the UEs 101A . . . 101N can support any type of interface to the user (such as "wearable" circuitry, etc.).

By way of example, the UEs 101A . . . 101N, 103, and service provider 107 can communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

One or more embodiments described herein are related to multimodal user interface (UI) concepts and graphical UIs, and can act as a replacement for current UIs and can replace the entire UI framework.

Typically GUIs are intended to simplify navigation and make it easier to find things and manipulate them. The desktop metaphor used in personal computers, for example, is a common example of GUIs. For smaller screens, such as on mobile telephones, personal digitals assistants (PDAs), digital media players, etc., metaphors are slightly different such as, for example, an idle-screen, or an application view arrangement, etc. Even with these variations, they are based on the same basic principle as typical text menu based UIs, where a user has to actively navigate through various menus in order to find things, which means that the user has to know what he or she is after. However, if the user is not sure of what they are looking for, then it is difficult for the user to find what they are looking for in the various menus. If user wants to customize the idle screen, then the user is forced to find the correct place in the settings to customize the idle screen. Different aspects of the screen may even be controlled in multiple places. One problem for such UIs is the configuration and adaption of the UI to user preferences. Typically, settings and configuration controls are in a different view or in a different mode of operation, and therefore, the user has to open separate settings dialogs, change settings, close the settings dialogs, and then the user can continue normal UI operations. However, such procedures distract the user and increase the difficulty in performing such settings changes, thereby reducing the effectiveness of the system. Therefore, an improved UI is desired.

Also, human beings are not always rational. They can act spontaneously based on associations or stimuli. In other words, a user can decide to do something when he or she sees something. For many decisions and actions, human beings need stimulus or some triggering event. Very static surroundings have little means of providing such stimulus. Therefore, they may go to shops to spontaneously browse shelves, without knowing what they would like to buy. The same concept applies for computers and smart phones, where the user may simply want to browse through various applications and data on the device without having a specific destination in mind. When browsing in this manner, the user's interest may suddenly be triggered by some association, whereby the user connects a visual item on the shelf or on the device to some older memory association, and based on this association the user decides to buy the product or open the data/application.

Traditional UIs do not support spontaneous human behavior described above. If a user is familiar with the system and its navigation structure and has some specific task in mind, then traditional GUIs are rather well suited for the task. However, if the user is unfamiliar with the system and navigation structure, then traditional UIs can be very difficult for the user to utilize to its fullest potential. Also, if the user just wants to kill some time or do a "window shopping" kind of activity, then such activities are not well supported by traditional UIs. The device may contain functions or data the user is not aware of, and thus cannot even find. Static graphical presentations do not trigger new associations. Embodiments described herein advantageously provide GUIs that a randomness aspect and provide a type of "living" functionality, which would feed the user some new "fuel" for associations in order to trigger some new and even unexpected events.

Modern mobile devices are typically relatively small, and therefore offer challenges for typical GUIs. The screen is typically relatively small and cannot hold very much information at a time. Limited screen space leads usually to difficult navigation through deep menus, which may also lead to loss of position and uncertainty on how to get back or how to find items in complex menu structures. Modern devices often use desktop metaphor (e.g., windows), home screens or idle screens (e.g., S60 idle screen that runs on Symbian OS (operating system)), in which there are typically few icons or widgets, which user can usually configure. However, modern mobile devices have a lot of functionalities and can store a lot of data, so selecting only a few widgets for the screen is difficult, and the screen can fill up quickly. Thus, it can be difficult to stuff all the frequently used applications, links and contacts into a single small screen. One approach is to use several idle screens and have means for switching the view easily. However, switching views makes navigation more difficult and the user may get lost if the view is changed accidentally. View-switching is fast and sudden operation that is inconvenient for the user, and suddenly changing views may cause stress, the user may lose the feeling of knowing where he or she is within the structure of the GUI and be left with uncertainty of knowing the way back to a known location within the GUI. Also those views can create a new hierarchical navigation layer, "list of views", so the user is back in navigating traditional UI-structures. Adding those views will just increase the layers user has to navigate, thus making the navigation even more complex.

Accordingly, embodiments of the GUI described herein advantageously provide a new and unique way to present data and device functions (or applications) to the user, which takes into account an association process, by which the human brain processes inputs. The GUI presents data and applications as "objects" that are presented in a fluid manner as flowing across the display so as to provide the user with a novel manner in which to access and utilize the data and applications. With this GUI, data or applications are navigating or flowing to the user, so user has to just wait like a hunter and hit when he or she sees the target.

As used herein, the "objects" can be any piece of data (e.g., contact information, pictures, videos, movies, music, messages, files, calendar entries, web links, game data, electronic books, television channels and/or programs, radio broadcasting channels and/or programs, media streams, point of interest (POI) information, data (e.g., regarding various products for sale online, such data being used to identify the products during an online shopping search, etc.), etc. or any combination thereof) or application (contact database, calendar, mapping function, clock, control panel or tools for user customizable settings, media player, games, web browser, camera, etc., or any combination thereof) or groups containing data and/or application objects that are accessible by the user utilizing the GUI (e.g., stored locally on the device, and/or remotely stored and accessible using the device). The GUI system can treat all objects regardless of their content in the same way, and high level manipulation of any object can be identical. Therefore, the GUI can present objects from different categories and abstraction layers, and those objects can be manipulated in the same manner regardless of their category or abstraction layer. For example, the user can create object groups, where contacts, links, applications, music, etc. can be within one group. There are no artificial system decided categories or boundaries to grouping, but rather such groupings are up to user as to how he or she uses and associates different data and applications available in the system. Objects are content agnostic, and thus the user manipulates objects in the same way independent of the content. Only after selection of an object from the flow can the user have some object specific actions available. However, for general object manipulation on the GUI (e.g., grouping of various objects, "pinning" or fixing the location of an object on the GUI, "kicking" or removing an object from the GUI, dragging or moving an object on the GUI), all the objects behave in same way.

As used herein, a "source" is a category designation that is used to generate a flow of objects within that category on the GUI. The source can be a labeled or non-labeled area of the display screen, from which objects start flowing across the GUI. The source can be broadly defined to include all data and applications accessible by the GUI, or it can be more narrowly categorized by application (e.g., all applications, mapping applications, messaging applications, media playing applications, etc., etc.), by a data item (e.g., all applications and data that have some predefined relationship to a particular contact entry, such as all photos, messages, etc. from the contact entry, etc., etc.), and/or by a data category (e.g., music, pictures, media recorded within a particular time period, etc., etc.). There can be one or more different sources of objects provided on the GUI at any given time, and the user can manipulate the source(s) by activating or deactivating the source, by defining the location of the source on the GUI and direction of flow of objects therefrom, and by defining the boundaries of the source (e.g., if the source is music, then the user could limit it to a certain genre, or to certain recording date(s), or to certain artists, etc.). In certain embodiments, the sources are located on the edge of the screen and are labeled using a transparent bar. The user may, for example, activate a source on the left side of the GUI by making a left-to-right stroke motion across a touch screen, and, after that, objects that are associated with that source begin flowing across the GUI from left to right.

To find a specific object from a source, the user is provided with means to filter the stream of objects flowing onto the screen. All search methods are available for all content types, when applicable. If the user learns to search for a contact by using text based search, he can apply this skill to any object, which contains something corresponding to the search text string. In certain embodiments, there are no separate interfaces for searching for a contact, or a message, or any kind of content. It is obvious that some search methods are better suited for searching for a specific content; however, it is up to the user to decide the methods, and thus the system does not set some predefined restrictions to the user. As an example, S60 operating system provides text based search for finding a contact. However, that is available only for the contacts and any other content types have different means and ways of searching. In various embodiments of the present invention, these high level object manipulation and search methods are the same for all the objects and contents. The system just provides a set of searching methods and it is up to the user how he applies them for all the objects available.

Actually, any object can act as a source. The user can transform any flowing object into a source by activating the object. One embodiment of this activation is that user drags the flowing object into specific area of the screen. As mentioned above, sources can be placed on the side of the screen. If the user drags some flowing object into that position, it will transform itself into a source and start producing content to the flow. That content can be anything, which is somehow associated to that object. For example, a group object, when acting as a source, will create a flow of objects which belong to that group, like a group of contacts. The user can also drag an individual contact as a source. Then that contact acting as a source, can flow out some relevant contact dependent data, like friends of that contact, or pictures relating to that contact. In other words, when any object is acting as a source, it will show up to the user the associations existing for that object. As long as the object is not needed as a source, the user can drag it out from the "source area" of the screen and object will then dive into the flow and start flowing like it was doing before it was dragged to act as a source. So, source can be also interpreted as a one form of any object, or as a state of an object. An object either flows across the screen, acting as itself, or the object is acting as a source, presenting all associations relevant to that object.

These source elements or objects acting as a source can be also stacked in the screen as a "stack of cards". If the user has put some object to the side of the screen to act as a source, then he can drag a new object on top of the old source and then that new object will start acting as a source. However, when the user drags the latest object away from source area, the original object under the new one will again activate itself. The user can stack an infinite amount of objects into the source stack and instead of taking objects out of stack one by one, the user can also flip through the stack like flipping through a deck of cards. Always the top object visible on the stack is active and produces content to the flow. This flipping of source stack can be implemented on the touch screen by gestures or strokes mimicking the real flipping actions of a user hand or finger.

The GUI introduces a dynamic idle-screen type of interface, in which objects are flowing across the screen, and in which human interaction and/or context related data (e.g., location of the device, time of day, etc.) can affect the flow of objects and/or the category definition of the source by which the objects are flowing from. Objects will appear on sides of the screen and flow across the screen, and then disappear off another side of screen, if user does not access or manipulate them. The user has full control of the flow (e.g., speed, direction, content, size of objects, number of (moving and/or static) objects visible simultaneously at any given time, pattern of flow, etc.), so the user can speed it up, "kick" unwanted objects out, "pin" objects at a location on the GUI, move objects on the GUI, select an object and perform actions related to that object, etc. The user can also control the type of objects flowing past his vision with some simple multimodal actions or gestures, such as strokes on a touch screen or speech, by activating and manipulating the sources on the edges of the GUI. The GUI therefore does not require view switching or deep menu structures as in traditional UIs, since the data and applications of the device are just flowing past the user, and the user can act when he or she sees something interesting. The user can adapt the flow's content, speed, and type on the fly. The GUI system can learn the user's habits and preferences and adapt thereto, since the user can easily enable or disable objects or change the flow properties of the GUI to fit the user's needs or mood. Based on learned/tracked habits (e.g., selections made, associations made, objects kicked, etc.) of a user, the system can provide suggested objects to the user, for example, by increasing the frequency and/or priority of certain objects that correlate to the learned/tracked habits of the user.

The user can easily set some objects to be static in order to stop them from flowing, and can move them to a desired location on the GUI by dragging. The user can further lock a static object in place, which will disable dragging of the object, and thereby prevent accidental relocations. The user can also unlock and/or set the object in motion by "removing the pin" and the object will move away with the flow. Adding new static elements simply involves pinning down the objects from the flow with simple user gestures or other actions. The user has total control of how many static items are in the screen and what kind of data is flowing across the screen.

In certain embodiments, there are no predefined fixed elements in screen, but rather everything can be enabled or disabled on the fly, as desired and manipulated by the user. The GUI can be in constant motion until the user stops it or limits the flow. The GUI can continuously provide new excitation to the user. Without any user active action, the GUI system can gradually present all the data and applications to the user. If something appears that is not interesting to the user, then the user can explicitly discard or remove it with some simple action, thus indicating to the GUI system, that the object is not interesting to the user or is not wanted. Because all visual objects (except those objects that are pinned) have temporal visible life span, even objects that are uninteresting to the user will disappear and therefore do not create constant nuisance to the user. The GUI system can propose some intelligent guesses for objects that are displayed based on the user's past use of the GUI and objects that were previously selected by the user.

In short, the GUI system can include a flow of objects, like a waterfall or a stream, which flows past the user's field of vision. The user can manipulate that stream and slowly adapt its behavior to fit user's personal needs. The user can pick any interesting item from the stream and operate it. The GUI system can also include sources, which can be defined by the user so that the user can control categories of data and/or applications that are flowing in the stream. The user can shut down or open these flow sources as he or she sees fit. Since the GUI screen is used more actively, it can display more data and applications than a static UI, thus allowing for more effective use of the relatively small screens of mobile devices.

Configuration of the flow is done in the same context as manipulation of objects, so there are no separate views for settings. Settings can be performed on the fly during normal flow of the GUI, thus making adjustments easier for the user.

The GUI concept supports association of related events. It fits well to a basic way in which human memory works, as many activities of humans are triggered by a person associating two objects or events and acting based on that association. At first glance, the two objects may appear to be totally unrelated to one another to an outside observer; however, these two objects may trigger an association in a user's brain. Such associations might not be recognizable by any intelligent UI-logic and thus a UI might not be able to predict such associations; however, the GUI described herein facilitates such associations to occur in the user by providing the user with a dynamic and diverse display of objects which may trigger such associations in the user, and allow the user to act on such associations. The GUI described herein provides several ways of harnessing and utilizing this association phenomenon.

The GUI facilitates object associations. In object associations, a user sees two objects flowing in the GUI that are related to one another based on the users experiences. For example, the user may see an object for a picture of a friend, and an object for an album that reminds the user of that friend, and the user may want to group the picture and the album together based on this association. While there are no predefined system rules to predict such an association, since this association occurs in the user's mind, the GUI provides a flow of objects that can facilitate such associations to be made by a user. When the user notices some relation between two objects, then the user can start different activities based on that observation. For example, the user can group those objects together to make a link between objects. Thus, the user can manipulate those objects together, or if the user later sees one of those objects alone on the GUI, then the user can quickly recover all the objects grouped/linked/associated to that object. In another example, the user may see some data and a contact entry simultaneously on the GUI, and decide to send that data to that contact. These associations can happen between any objects, and the system will not prevent the user from making "non-sensical" associations or groupings. Such associations are purely up to the whim of the user. For example, the user can connect a web-link and a person, or a music album and a food recipe, if so desired. Also objects with different abstraction levels can be combined. The GUI system just sees this process as a network of user generated associations and does not care what the content is of the associated objects. Thus, the user can group together contacts from a contact list with pictures, music albums, applications, etc. Certainly, the GUI system can intelligently propose some objects to the user and see, whether user sees some association between the proposed objects. However, it is up to the user to do the association, system can only try to help and create some potential or probable stimulus. The invented system supports this behavior very well, system proposed items just flow past user vision and if the proposal was incorrect, objects just flow away, not bothering user anymore. In the traditional system, static pop-up windows and icons start irritating the user if the life-span of those proposals is too long. There are no such problems in the invented system.

The GUI also facilitates context associations. In context associations, the user sees an object on the GUI and an association is triggered based on user context. For example, the user may see a contact on the GUI, which the user has not seen for long time, and the user then suddenly notices that this person is living near by and decides to contact him or her. In another example, the user may be sitting in a restaurant and sees a contact that the user has promised to offer lunch.

The GUI also facilitates source associations. In source associations, the user associates certain objects to a specific source, which is located in the certain location of GUI. Thus, the user will learn to assume that the source will produce certain kinds of objects. Also, sources need not be fixed, but rather can be adapted by the user and any associations that the user wants to define.

In order to make these types of associations occur in a user's mind, the user needs some excitation to trigger this association process. Static home screens do not activate such association processes. Also, if the system is too deterministic, then it may never create some less frequently used associations. So the GUI described herein advantageously provides constant excitation and is partially deterministic, partially random, and user guided, which allows it to facilitate such associations. There are endless and even strange ways that human memory forms such associations, and the GUI described herein gives fuel for that process, rather than limiting it with too many artificial rules. The GUI is a tool that provides means for allowing a user to make his or her own associations, and to adapt to the way the user's memory works.

Figure 2:
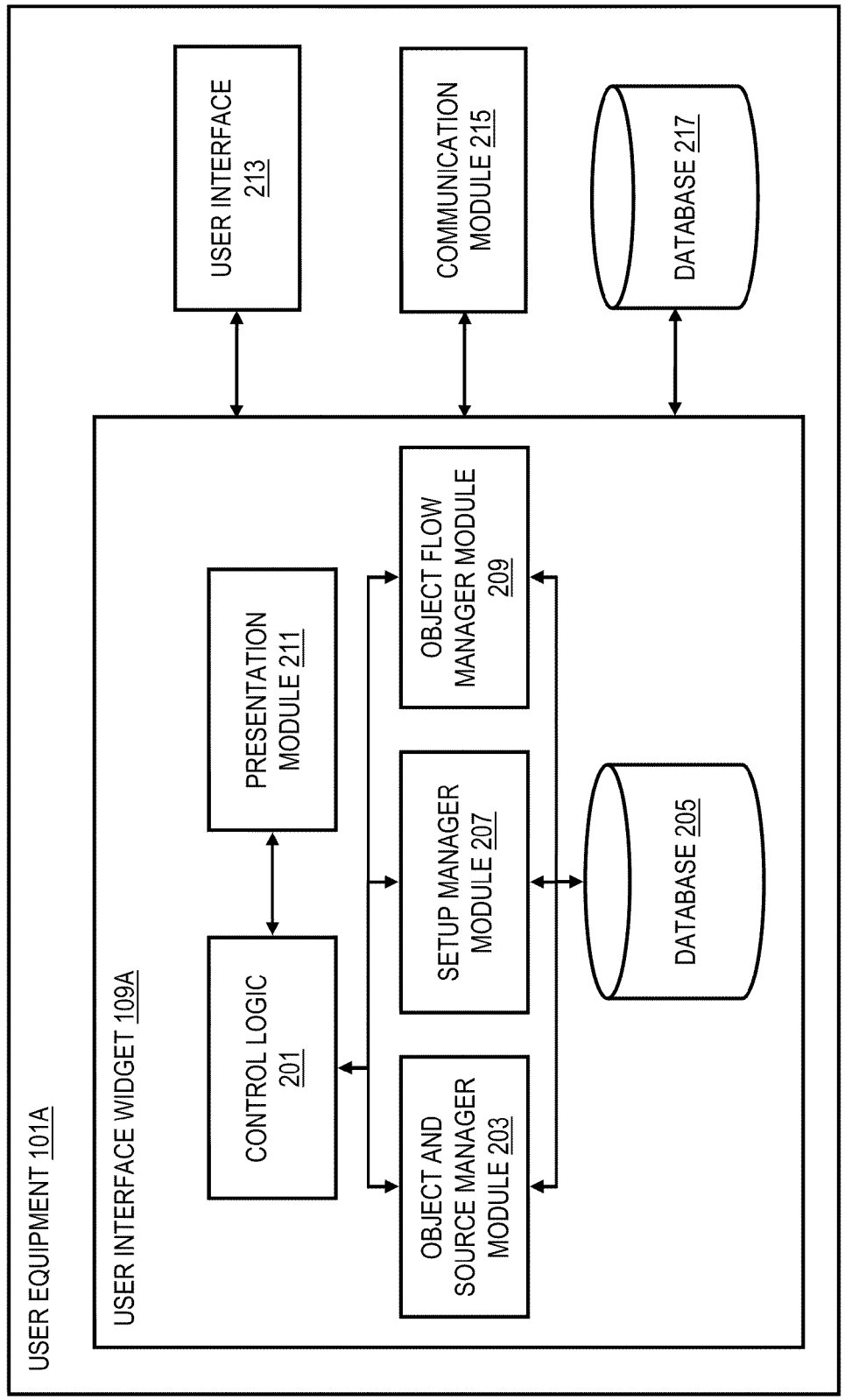
FIG. 2 is a diagram of the components of user equipment including a user interface widget, according to one embodiment.

FIG. 2 is a diagram of the components of user equipment including a user interface widget, according to one embodiment. By way of example, the user interface widget 109A includes a control logic 201 that controls the widget and fluid graphical user interface (GUI), an object and source manager module 203, a database 205, a setup manager module 207, an object flow manager module, and a presentation module 211. The object and source manager module 203 can manage a list of the objects for the GUI and the defined sources, and store such information in the database 205. The object and source manager module 203 can control the appearance of sources and objects based on user actions, and can determine different context information to influence the process. The setup manager module 207 can manage any user settings that are defined by the user for the GUI (e.g., size of objects, maximum number of objects that can be displayed at any given time, speed of flow of objects, etc.). and store such information in the database 205. The object flow manager module 209 can manage the flow of the objects based on inputs of the user, and store such information in the database 205. The object flow manager module 209 can control the number of objects visible simultaneously to avoid overloading user cognition with too many moving objects, and can handle system configurations in light of user actions that are performed during operation of the GUI. The control logic 201 can also monitor various actions of the user, and control the operation of the GUI based on usage history (e.g., frequently used contacts, albums, applications, etc. can be given priority on the GUI by increasing the frequency by which they are presented on the GUI, or by displaying them on the GUI first, etc.).

The presentation module 211 can communicate with a display of a user interface 213 of the UE 101A to display the GUI. Additionally, the UE 101A includes a communication module 215 that allows the UI widget 109A to communicate with any remote device or server, if needed in order to present objects on the GUI, or to utilize data or applications associated with the objects. Also, the UE 101A includes a database 217 that can be used to store data and applications.

FIG. 2 depicts the user interface widget 109A provided in UE 101A in order to provide a GUI for data and applications locally stored on the UE 101A or accessible remotely from service provider 107 or another server or UE. Also, the user interface widgets 103A and 111 in UE 103 and server provider 107, respectively, can have the same components as user interface widget 109A, and thus can perform similar functions. The user interface widget 111 can have the same components as user interface widget 103A, and thus can provide, for example, a web-based GUI to any UE connected thereto via the communication network 105. Furthermore, such user interface widgets (or one or more components thereof) can be provided at various devices/servers, which can then be used in conjunction with each other to provide the GUI functionalities described herein.

Figure 3A:
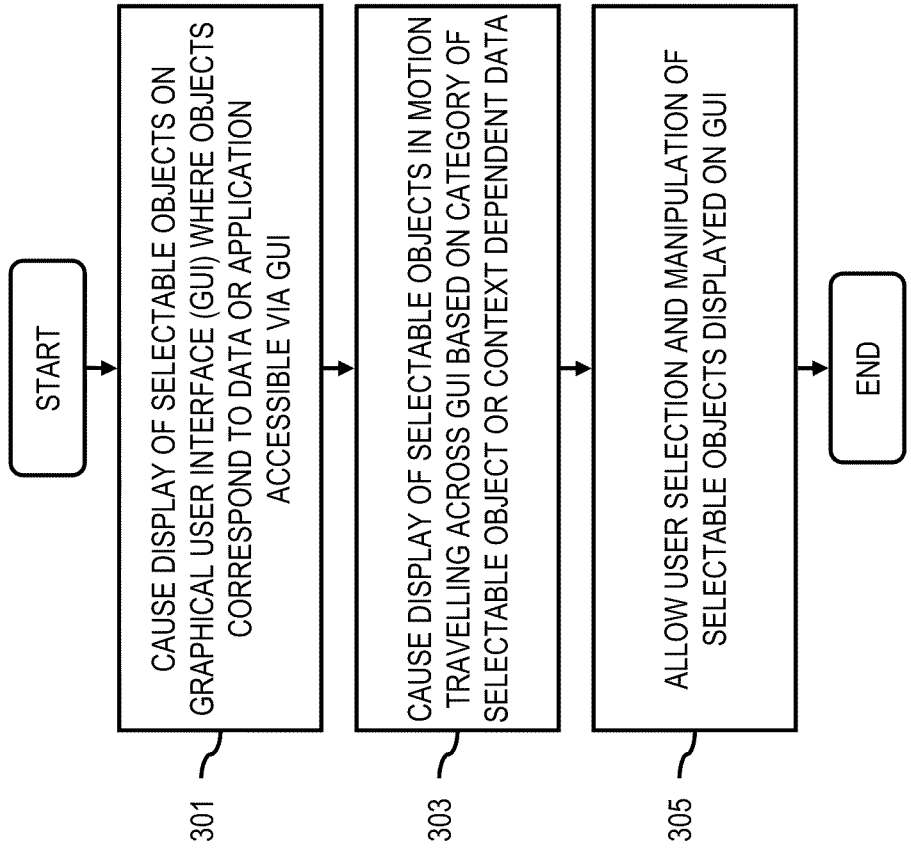
FIG. 3A is a flowchart of a process for providing a fluid graphical user interface, according to one embodiment.
Figure 3B:
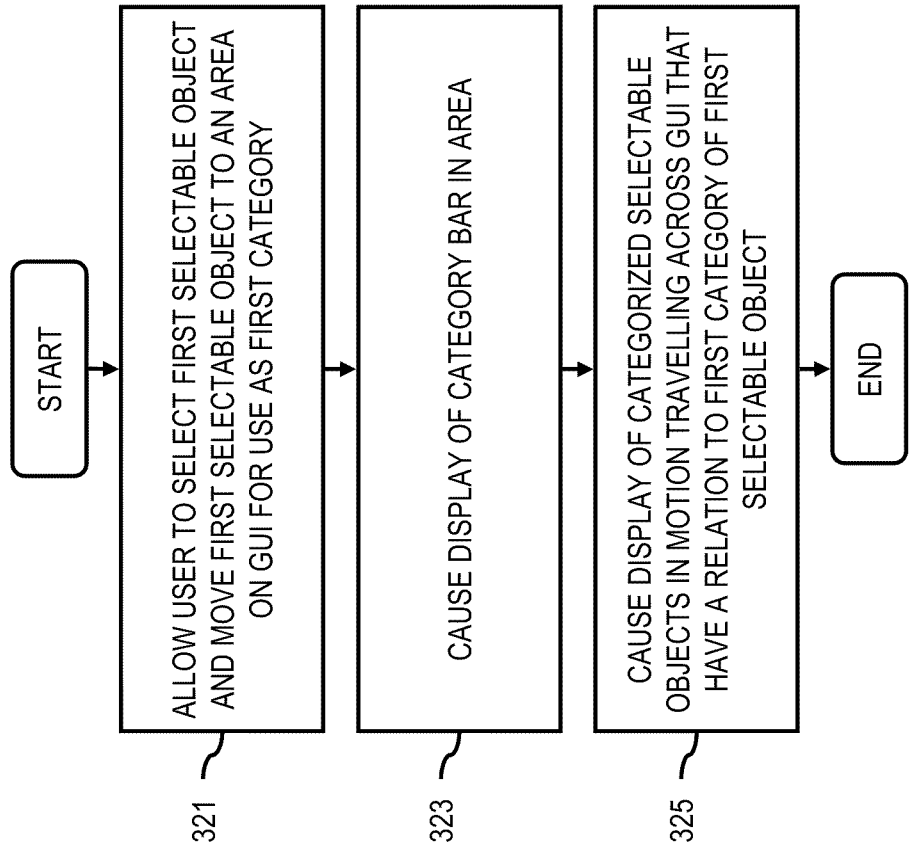
FIG. 3B is a flowchart of a process for providing a fluid graphical user interface allowing display of categorized objects, according to one embodiment.
Figure 3C:
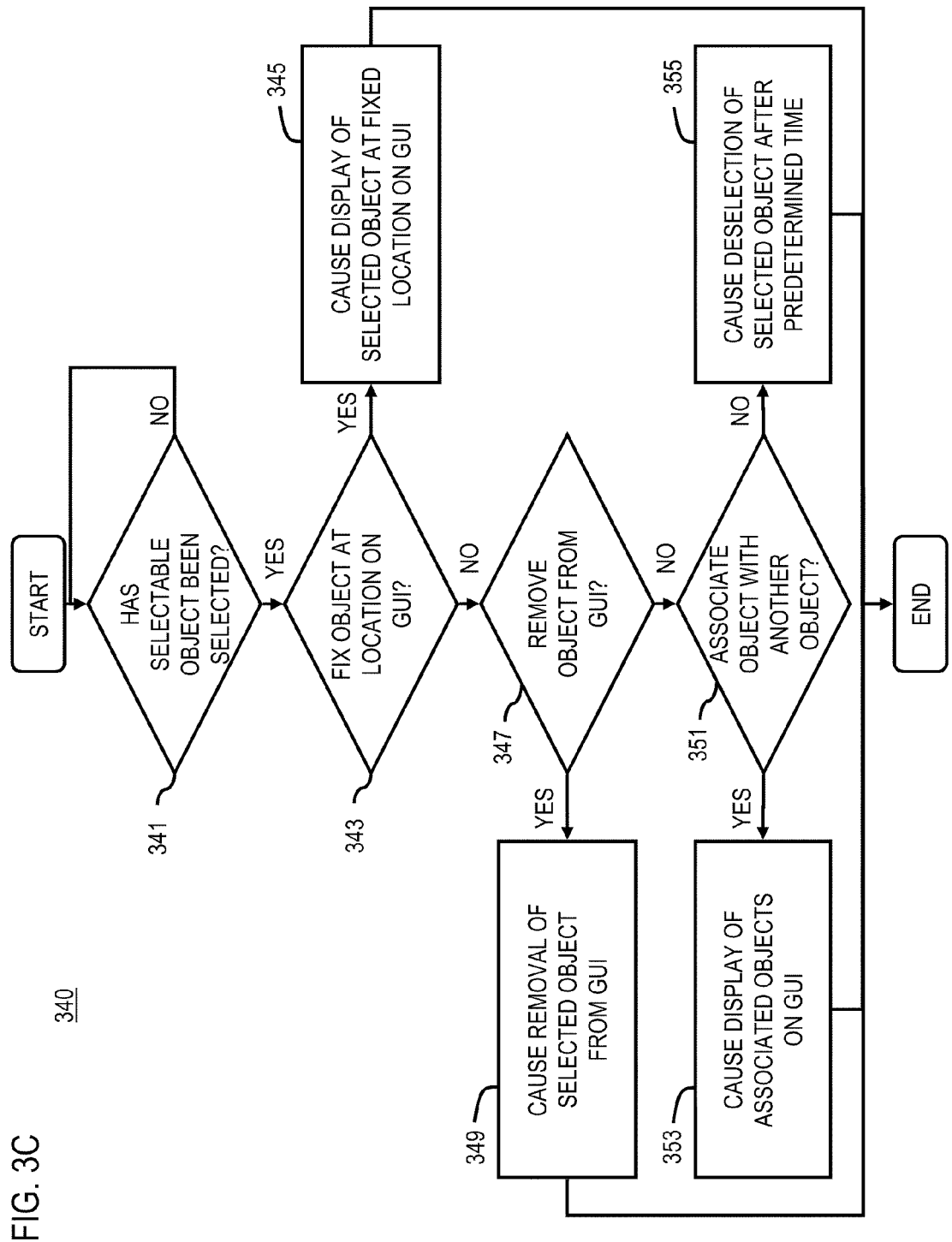
FIG. 3C is a flowchart of a process for providing a fluid graphical user interface allowing selection and manipulation of objects shown in the graphical user interface, according to one embodiment.
Figure 4A:
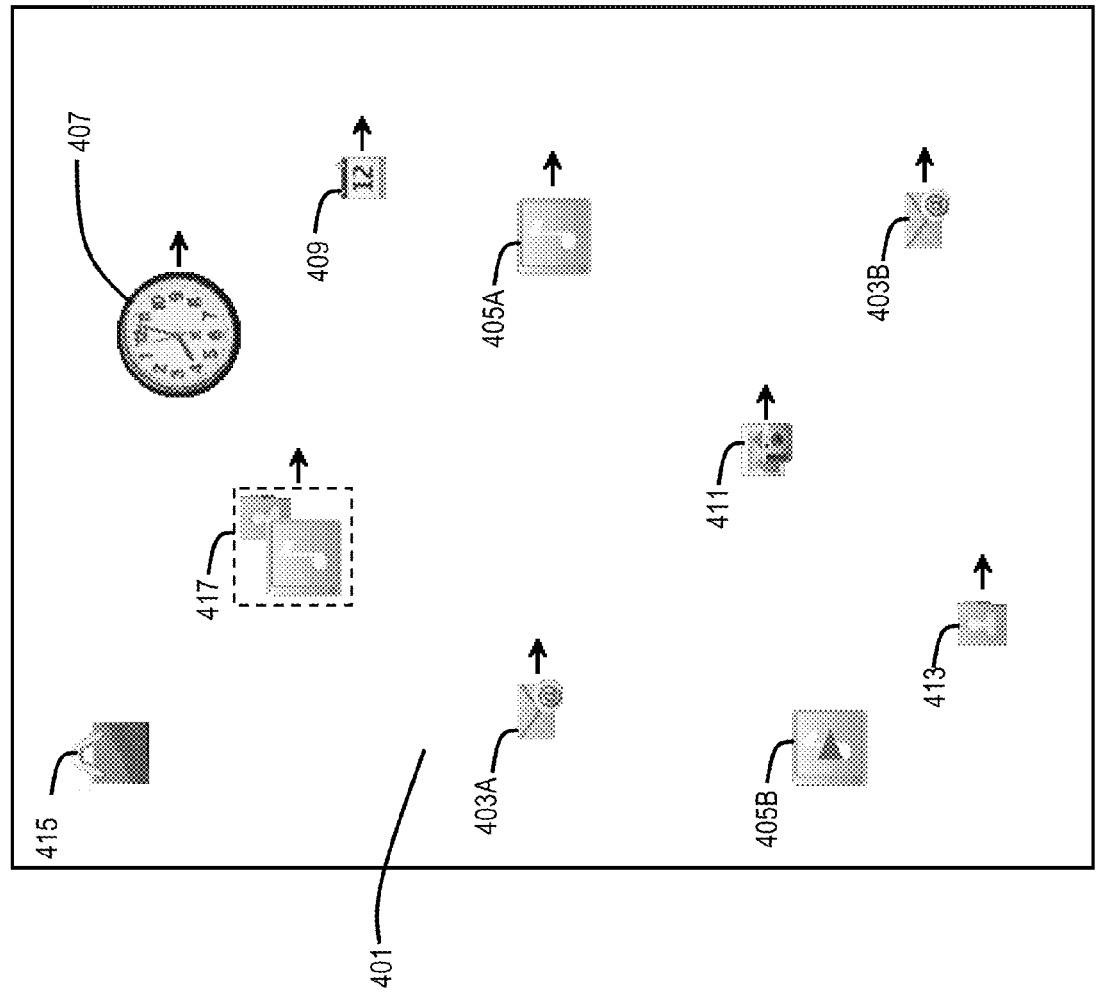
FIGS. 4A-4C are diagrams of graphical user interfaces depicting the processes of FIGS. 3A-3C, according to various embodiments.
Figure 4B:
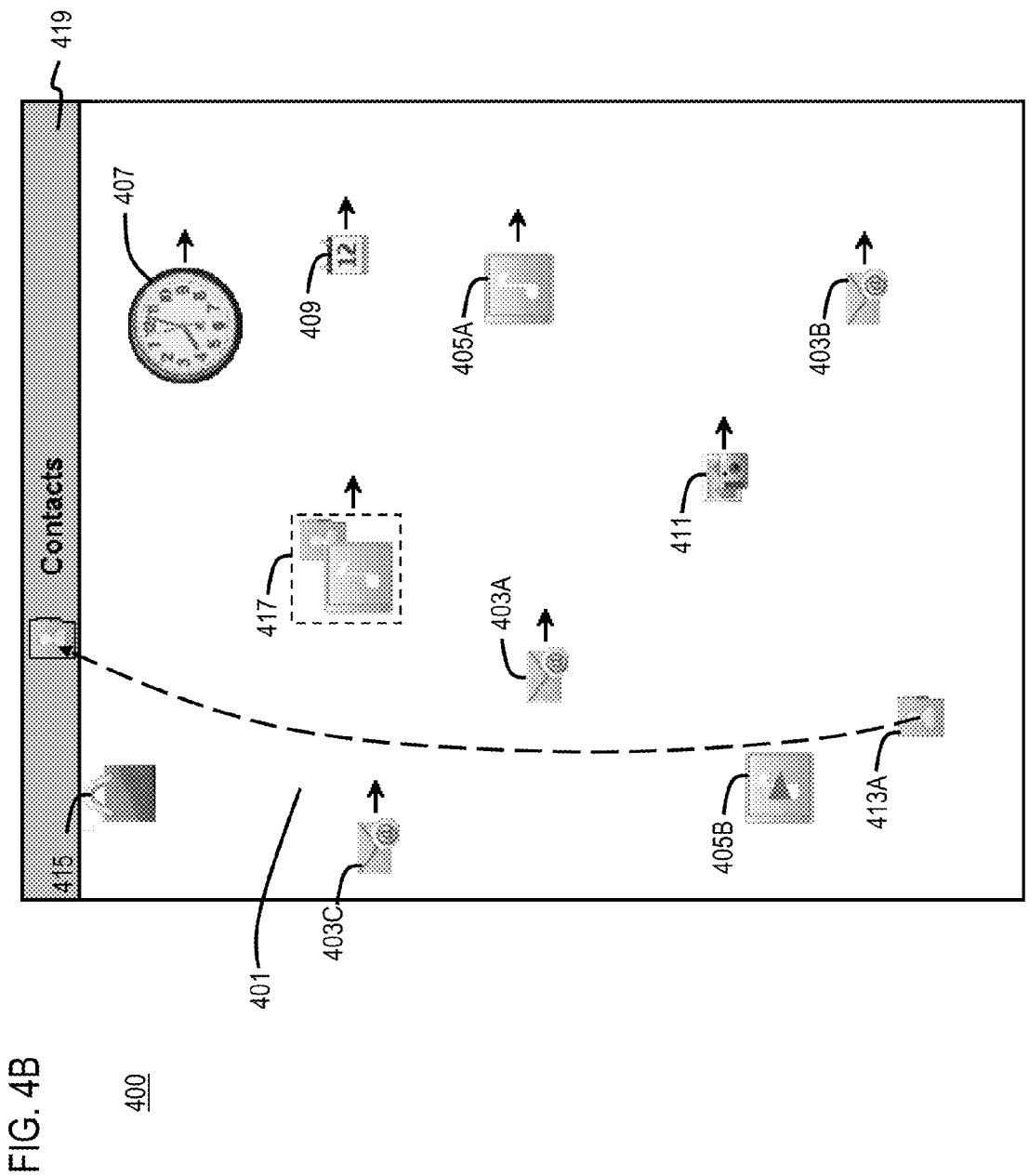
Figure 4C:
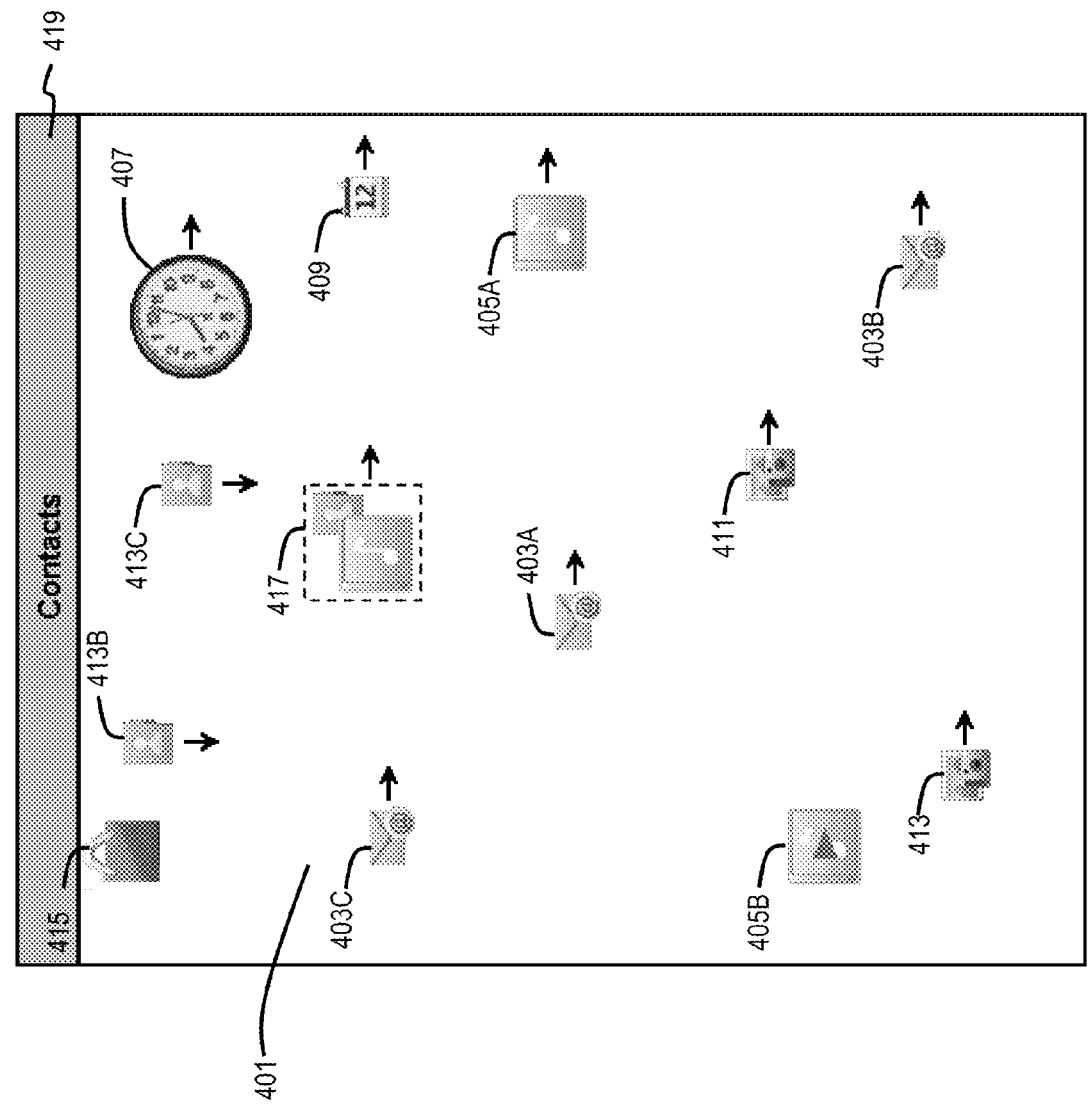

FIG. 3A is a flowchart of a process 300 for providing a fluid graphical user interface, according to one embodiment. FIG. 3B is a flowchart of a process 320 for providing a fluid graphical user interface allowing display of categorized objects, according to one embodiment. FIG. 3C is a flowchart of a process 340 for providing a fluid graphical user interface allowing selection and manipulation of objects shown in the graphical user interface, according to one embodiment. In one embodiment, the user interface widget (e.g., 103A, 109A ... 109N, and/or 111) performs the processes 300, 320, and 340, and is implemented in, for instance, a chip set including a processor and a memory as shown FIG. 8. FIGS. 4A-4C are diagrams of graphical user interfaces depicting the processes of FIGS. 3A-3C, according to various embodiments.

In step 301 of the process 300 for providing a fluid graphical user interface, various selectable objects are caused to be displayed on a GUI, where the objects correspond to data or application(s) accessible via the GUI. In step 303, the selectable objects are caused to be displayed in motion travelling across the GUI based on a category or "source" of the selectable object. Thus, as shown in FIG. 4A, a graphical user interface 400 is displayed that includes a screen area 401 in which various objects are display. In this instance, the category or source is broadly defined as any data or application accessible via the GUI, and therefore objects representing all data and applications accessible via the GUI will be cycled across the display screen. In this embodiment, at the outset (i.e., without any user input) each of the objects will, by default, be in motion moving from left to right, such that they appear on the left side of the display screen area 401, move across the display screen area 401, and disappear off the right side of the display screen area. FIG. 4A depicts objects that include message icons 403A, 403B, music icons 405A, 405B, a clock icon 407 that displays the current time, a calendar icon 409, a picture icon 411, a contact icon 413, a store icon 415, and a grouped icon 417. In step 305 of process 300, user selection of manipulation of selectable objects displayed on the GUI is allowed. In the instance shown in FIG. 4A, for example, the store icon 415 has been selected by the user (e.g., by touch screen or other button command, by voice command, etc.) and pinned at a desired location on the display screen area 401 such that it is no longer moving. Also, the music icon 405B has been selected by the user and fixed at a desired location, and the music associated with the music icon 405B has been instructed to play via an audio output, as can be seen by the triangle symbol shown in the center of the music icon 405B that indicates that the music icon is in a playback mode. Similarly, the user could select other icons, which could have associated therewith an editor or viewer, which would be activated by such selection. Also, the music and contact icons that make up the grouped icon 417 have been selected and linked together by the user. The remaining icons continue to flow in the right-to-left direction, as indicated by the directional arrows shown in FIG. 4A. In another embodiment the flow is paused while the user has selected some object in order to not distract the user while he is performing operation on some object. After completed user operation, the flowing will resume. The directional arrows are merely shown to indicate the direction of flow in the static screenshot of FIG. 4A, and would not need to be displayed on the GUI in a working GUI.

It should be noted that the selectable objects, as described herein, can, at various times, be either visible (e.g., while travelling across the GUI) or can be non-visible (e.g., after the selectable object has traveled out of the field of vision of the GUI).

While FIG. 4A depicts the objects as generic icons, the objects can be displayed such that the content represented by the object is shown. For example, the message icons 403A, 403B could display the sender of the message and a portion of the message, the music icons 405A, 405B could display the album name, artist name, track name, album artwork, genre, etc. of the music, or it could be a generic representation of the music library application; the calendar icon 409 could display a description of a meeting or date reminder, location, attendees, etc., or it could be a generic representation of the calendar application; the picture icon 411 could display a thumbnail view of the picture, title of the picture, date/time stamp, etc., or it could be a generic representation of camera, photo album, photo editing applications; a video icon could display a static or streaming thumbnail of the video, the video name, etc., or it could be a generic representation of video camera, video library, video editing applications; the contact icon 413 could display a description of a contact entity, thumbnail picture of the contact entity, etc., or it could be a generic representation of the contact list application; the store icon 415 could display an item for sale with information such as price, etc., or it could generically display the store logo and name, contact information, etc.; the group icon 417 could display a name given to the group, etc.; etc. Also, the objects can each travel at the same speed, or at different speeds, or each group or category can travel at different speeds with the objects in each group traveling at the same speed, or any combination thereof. The objects can travel in a straight line in any direction, or the objects can travel in a non-straight path in a consistent or random pattern, or any combination thereof. The objects can be shown at different fields of depth within the GUI, such that certain objects or groups are presented in front of others.

Also, as noted previously, the characteristics of the flow of the objects across GUI 400 can be controlled by user input. For example, the user can select the direction of flow, the speed of flow, the pattern of flow, the number of objects simultaneously shown in the display screen. Such user preference selections can be made using gestures, such as swiping motions across a touch screen (e.g., if the user prefers the flow to be from right-to-left then the user can swipe across the touch screen from right to left, etc.), or tilting the mobile device (e.g., where the angle and/or direction of tilt control the direction and speed of flow), etc., or using input commands, such as using buttons, touch screen selections, voice commands, etc. A toggle could be provided that enables and disables such inputs to control the user preferences, for example, so that a user can enable such inputs, then make adjustments by gestures/commands, and then disable such inputs, so that use of the mobile device does not make unwanted changes to such user preferences. Also, the user can access such selection options via an object representative of such options, and/or by accessing a selection options menu.

In step 321 of the process 320 for providing a fluid graphical user interface allowing display of categorized objects, a user is allowed to select a first selectable object and move the first selectable object to an area on the GUI for use as a first category or "source." Thus, as shown in FIG. 4B, the user selects contact icon 413A, and drags the contact icon 413A (as shown by dashed arrow) to an area along the upper edge of the display screen 401. Therefore, the contact icon 413A is used as a category or source of objects that flow therefrom. Any object can be used as a source for the GUI. In step 323, a category bar is caused to be displayed in the area, as can be seen by the contacts bar 419 in FIGS. 4B and 4C, which can be transparent. The bar can be labeled by the GUI automatically, or can be labeled by the user, for example, by the GUI popping up a transparent keypad or keyboard on the display that allows the user to enter the label. In step 325, categorized selectable objects are caused to be displayed in motion travelling across the GUI that have a relation to the first category of the first selectable object. Thus, as shown in FIG. 4C, contact icons, such as contact icons 413B and 413C, begin to flow from the contacts bar 419 from the upper side of the display screen 401 towards the lower side of the display screen 401. In this embodiment, the objects that do not fall within the contact grouping continue to flow in a left-to-right direction (unless they have been pinned). Alternatively, it is also possible to clear the screen of the objects not falling within the category defined by the first selectable object. This may depend on the screen size, i.e., in a very small screen it may be beneficial to clear the screen thus making more room for the objects belonging to the category defined by latest user selection of selectable objects. The contact icon 413A could be representative of the overall contact list application, in which case all contact entries will flow from the contact bar 419, or could be representative of a specific contact entry, in which case any objects that are related to the contact entry (e.g., pictures/videos of or from that person, objects grouped/linked to that entry, messages from that person, calendar entries related to that person, etc.) will flow from the contact bar 419.

FIG. 3C is a flowchart of the process 340 for providing a fluid graphical user interface allowing selection and manipulation of objects shown in the graphical user interface, according to various embodiments. In step 341, the GUI determines if a selectable object has been selected. If no selection has been made, then the process simply continues monitoring for user input until such a selection is made. If an object is selected, then the GUI determines the nature of the manipulation of the selected object as commanded by the user's input. For example, in step 343, the GUI determines whether the user has instructed the GUI to fix the object at a location on the GUI, for example by dragging the object a location and fixing and/or locking the object at that location. If the GUI has been instructed to fix the object, then in step 345 the GUI causes the display of the selected object at that fixed location on the GUI. If the GUI has not been instructed to fix the object, then, in step 347, the GUI determines whether the user has instructed the GUI to remove the object, for example by using a flicking motion on the touch screen to quickly remove the object from the display screen. If the GUI has been instructed to remove the object, then in step 349 the GUI causes the removal of the selected object from the GUI. If the GUI has not been instructed to remove the object, then, in step 351, the GUI determines whether the user has instructed the GUI to associate (or group or link) the selected object with another object, for example by dragging the select object over the other object using the touch screen. If the GUI has been instructed to associate the object with another object, then in step 353 the GUI causes the display of the associated objects on the GUI. If the GUI has not been instructed to associate the object, then, in step 355, the GUI can causes the deselection of the selected object after a predetermined time period has elapsed.

Figure 5:
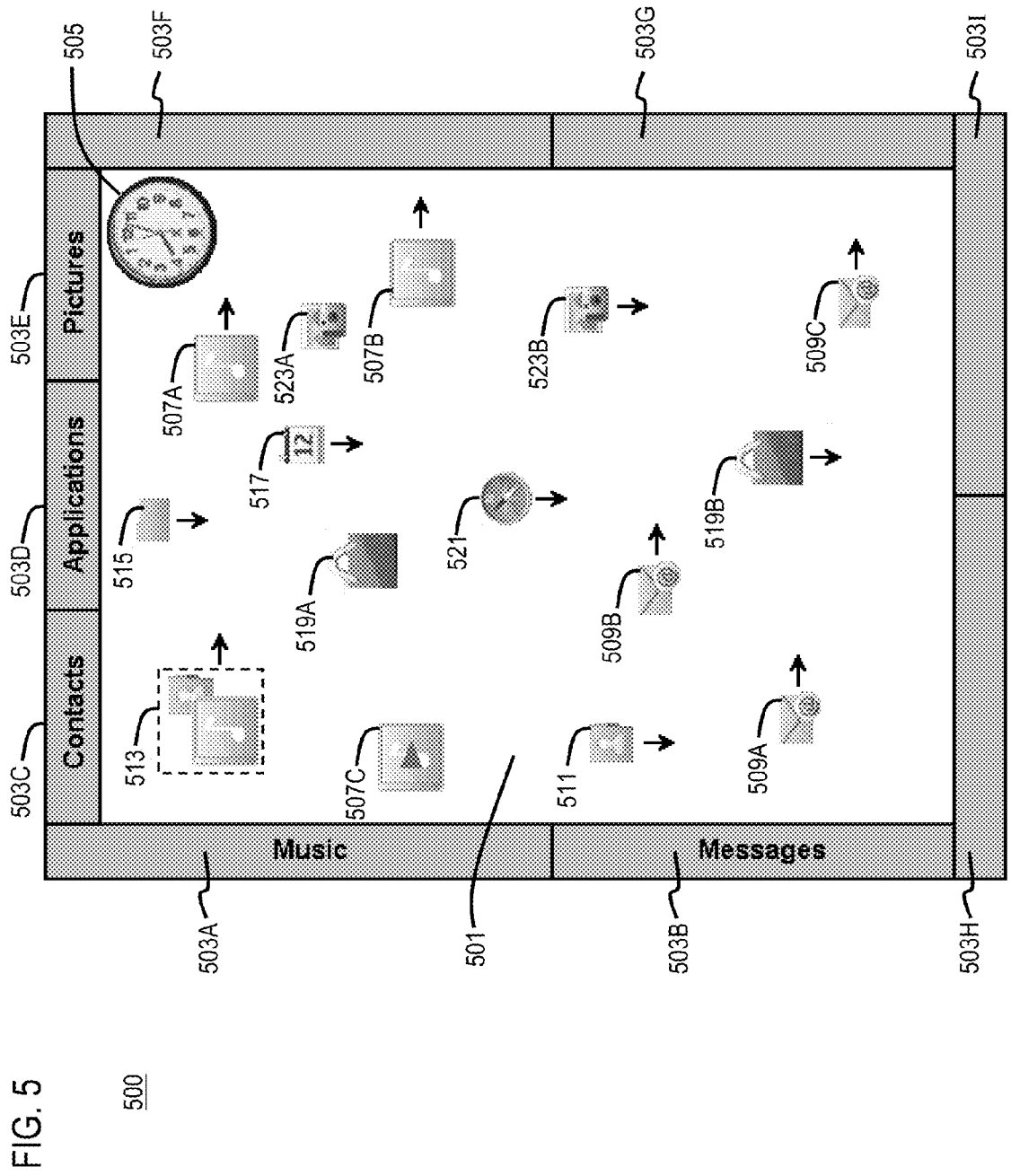
FIG. 5 is a diagram of a graphical user interface, according to various embodiments.

FIG. 5 is a diagram of a graphical user interface 500, according to various embodiments. The GUI 500 includes a display screen 501, and various category or source bars provided around the edges of the screen. For example, the GUI 500 includes a music bar 503A, a messages bar 503B, a contacts bar 503C, an applications bar 503D, a pictures bar 503E, and undefined or inactive bars 503F, 503G, 503H, and 503I. The size and location of the various bars can be adjusted by the user, and if preferred the active and/or inactive bars can be visible (and opaque or transparent) or invisible (e.g., consistently invisible or invisible unless the user makes a gesture or command to temporarily make them visible). In one typical alternative, only one bar is active and visible at a time, indicating the latest user selected category, producing flow of object in the direction the user has initiated. It also possible to have system generated flow of objects, with no visible source bars. This flow can be triggered by some system event, like time of day, location or some other external event.

FIG. 5 depicts objects that include a pinned clock icon 505, music icons 507A, 507B, 507C (which is pinned and in a play mode), message icons 509A, 509B, 509C, a contact icon 511, a grouped/link icon 513, a computer file icon 515, a calendar icon 517, shopping or store icons 519A (which is pinned), 519B, a mapping icon 521, and picture icons 523A (which is pinned), 523B. The objects can flow from the side having a category or source bar from which they are generated. For example, music icons 507A, 507B, 507C (prior to pinning), and even grouped icon 513 that contains a music icon, flow from the left side of the display screen 501 where the music bar 503A is located. Also, message icons 509A, 509B, 509C, flow from the left side at which the messages bar 503B is located. Also, the contact icon 511 flows from the upper side at which the contacts bar 503C is located. Various application icons, such as the computer file icon 515 (which can be representative of a word processor application, etc.), the calendar icon 517, the shopping or store icons 519A (prior to pinning), 519B, and the mapping icon 521 flow from the upper side at which the applications bar 503D is located. The picture icons 523A (prior to pinning), 523B flow from the upper side at which the pictures bar 503E is located. Similarly, the user could define bars 503F and 503G to a particular category or source and objects can flow from the right side of the display screen 501 towards the left side, and could define bars 503H and 503I to a particular category or source and objects can flow from the lower side of the display screen 501 towards the upper side. Also, the user can adjust any of these default flow directions as desire on the fly using gestures and/or commands. Alternatively, it is also possible that if all the objects, which fit within active selected categories and filter sets are already visible on the screen, then the flow can automatically stop because no new objects are coming into the screen. In other words, the user may have selected some category, which has only a few items matching to that category and when those items have moved into the visible screen, then the flow may be stopped in order to make easier manipulation of objects. As an extreme case, there may be just a single contact, which fits into selected categories. In that case, when that contact has appeared into the screen, then the flow is stopped to wait for user action on that contact. However, as soon as there are non-displayed objects fitting within the selected categories, then the flow will be activated again.

Figure 6A:
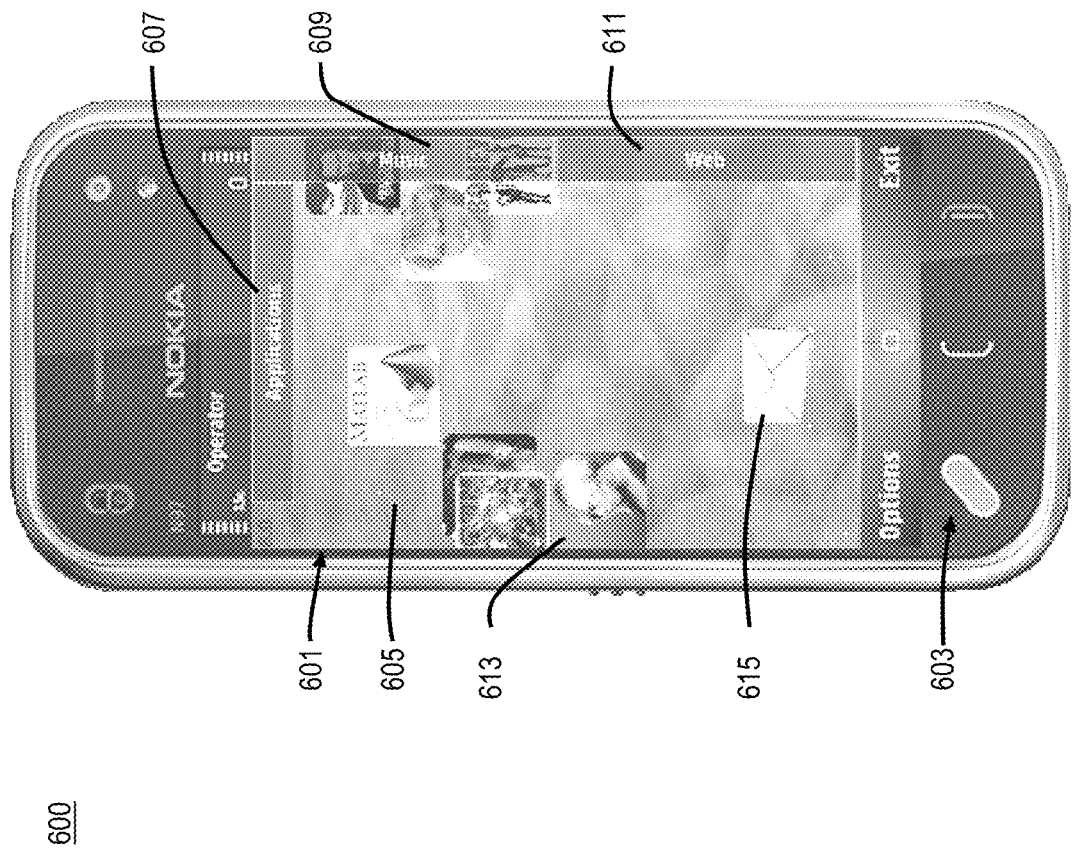
FIGS. 6A-6C are diagrams of mobile devices displaying graphical user interfaces, according to various embodiments.
Figure 6C:
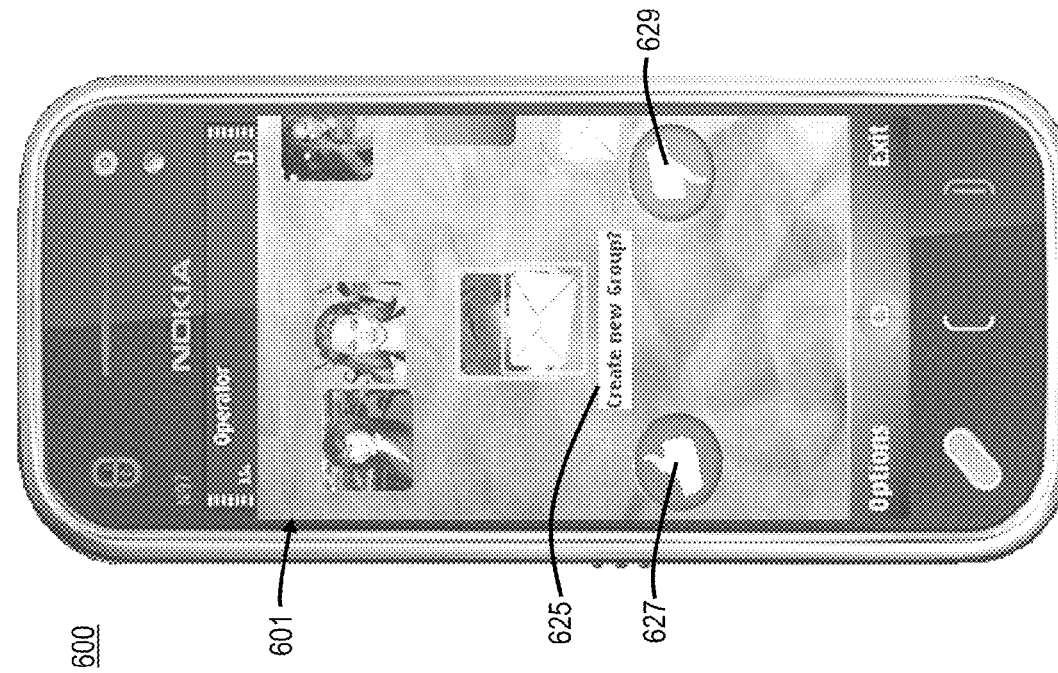
Figure 6B:
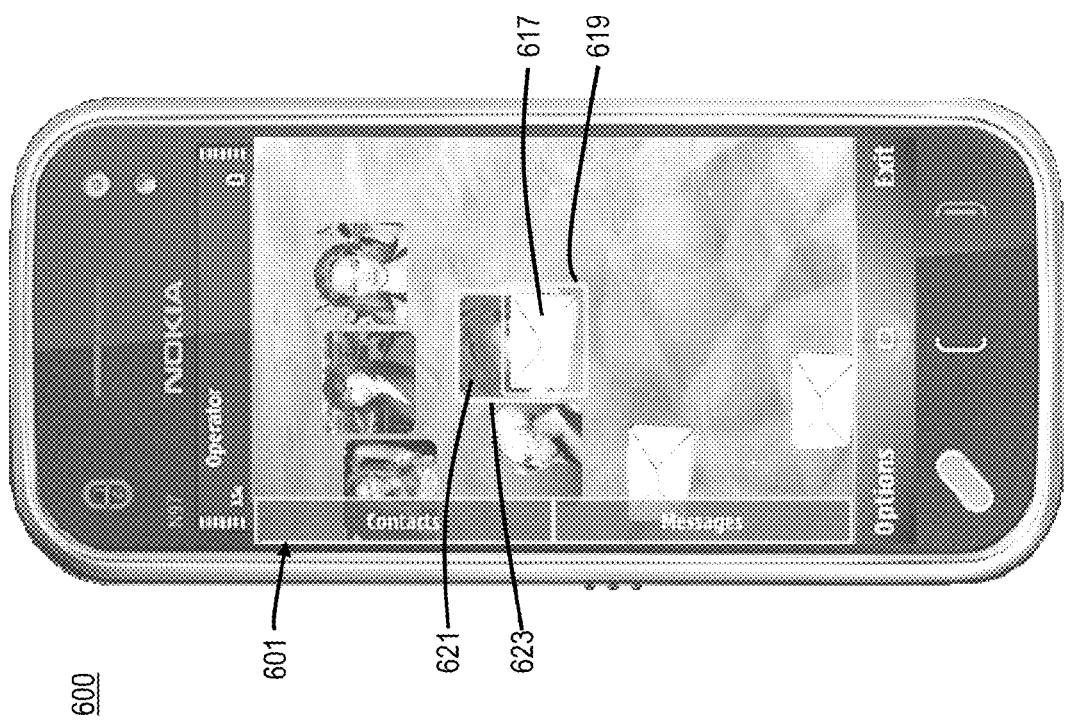

FIGS. 6A-6C are diagrams of mobile devices displaying graphical user interfaces, according to various embodiments.

FIG. 6A depicts a mobile device 600 that includes a display screen, such as a touch screen display, that is displaying a graphical user interface 601. The mobile device 600 also includes various user input devices, such as buttons 603. The GUI 601 includes a display screen 605, and various category or source bars provided around the edges of the screen. For example, the GUI 601 includes an applications bar 607, a music bar 609, and a web bar 611. The GUI 601 also has various selectable objects, such as objects 613 and 615, which are flowing across the display screen 605.

FIGS. 6B and 6C depict the mobile device 600 and GUI 601 thereof in a slightly different configuration, such that a contacts bar and a messages bar are provided as sources on a left side of the display screen thereof. FIGS. 6B and 6C depict an embodiment in which two objects are grouped or linked together. Thus, in FIG. 6B, the user (e.g., using the touch screen, voice commands, or other input) selects object 617, as can be seen by a selection box 619 that appears around object 617, and drags object 617 over object 621, which is then indicated as being selected by a selection box 623 that appears around object 621. The GUI 601 then displays a text box 625, as shown in FIG. 6C that asks the user whether the user wants to create a new group, and the user can answer either yes, using the thumbs up icon 627, or no, using the thumbs down icon 629. If the user decides to create a group, then the icons 617 and 621 will be joined together, and the user can be prompted with another text box that allows the user to create a title and/or description for the group, for example, using a keypad or keyboard (e.g., a transparent keypad/keyboard display on the GUI or a keypad/keyboard built into the device). The newly created group icon can then flow across the GUI 601 in much the same manner as group icons 417 and 513 described above.

Additionally, objects can include metadata that defined certain characteristics of the object, such that when the object is selected, then the system can use the metadata of the selected object to search for other similar types of objects or related objects, and then the objects found during that search can flow closer to the selected object so that user can be given the opportunity to build a group from these suggested objects found during the search. Thus, with this "object flowing" approach, the user can then ignore the suggested objects, group the suggested objects, or kick out some of the suggested objects if the user does not want them to belong to the group.

There is no limit to number of sources that can be defined on the display screen of the GUI within the confines of size and shape restrictions of the screen. For a typical smartphone screen, one to six sources can be a good estimate; however, additional sources can be defined if so desired by the user. It is also possible to stack the sources (e.g., like a stack of cards), which can be shuffled using some gestures or commands. The top-most visible source on that stack is the active source, which produces objects to the flow.

As can be seen in FIGS. 4A-4C, 5, and 6A-6C, the basic operation of the GUI is very simple and straightforward, thus creating a natural and easy to grasp interface for the user. The user sees sources and objects, and can easily learn to manipulate, access, and control them in one uniform and simple interface.

Pinned objects can remain stationary until a user releases it, moves it to another location, removes it from the display screen, etc. Pinned objects can be dragged freely to any suitable position on the display screen, and can be locked in position, if desired, in order to prevent any accidental movement thereof from the pinned location.

The GUI is customizable and allows a user to select and manipulate objects and sources using a plurality of interaction methods such as speech or touch. Rules for selected objects can be defined by a selecting action and/or function of metadata linked to objects.

Two or more objects can be associated with one another, in order to create a link between them. Such associations can trigger some interaction between two or more linked objects. Also, two or more groups of linked objects can be associated with one another, thereby creating links between these groups of already associated objects. The groupings can allow the user to access and operate all the elements in the associated groups through single object in that group.

The GUI presents data and application that "flow" to the user, so that the user can simply wait like a hunter and select a target when he or she sees the target. Thus, the GUI provides a very natural and relaxed way of accessing data. Also, in such a configuration, the user does not have to know exactly what he or she is looking for, and can access data and applications on an ad-hoc basis. The GUI may trigger some user actions almost accidentally, for example, the user may start some action just because he or she associates something moving across the display to the current context the user is living in. So the system is utilizes the user's intelligibility and ability to associate things based on the user's context. The GUI provides tools to the user and does not try to pretend to be too intelligent, since machines cannot be intelligent in wide enough sense to really predict irrational human behavior.

The GUI supports spontaneous and irrational access to device functions. It will however adapt the appearance and order of the flow for the objects based on the frequency of use and other context data. So even though the flow may look random, it has some deterministic elements (e.g., the most frequently used contacts may flow onto the display screen first or more often than less frequently used contacts, etc.). Also, very infrequently used objects can also enter the display screen, even if the user has forgotten the object, thereby supporting discovery or rediscovery of objects. The GUI is also ideal for learning to use a new device, because some hidden functionalities will navigate their way to the user via the GUI, not the other way around.

The user can adapt the system to his or her liking during normal usage, and therefore separate settings and configurations menus are not necessary, but rather the settings and configurations can be changed by the user on the fly. For example, a user can use gestures and/or speech to manipulate the flow, as well as the objects and sources. The GUI is dynamic and adaptive, and the user has full control thereof (e.g., if the user wants to maintain some fixed objects, etc.), such that the user can decide how much freedom the GUI allows in the manipulation of objects/sources. Using a dynamic flow of objects enables better handling of large number of objects. The user can access different functions and tasks from a single interface, without the need to switch between different applications. Complex hierarchical menu systems and view switching can be avoided or at least reduced. The GUI can be a fun and enjoyable manner in which to utilize the data and applications of the device, and can always offer something to the user that might otherwise go unnoticed. The GUI is forgiving, for example, uninteresting objects can simply flow away without remaining in the display screen without user permission. The GUI provides new stimulus to the user that allows the user to make new associations between various objects. Human associations can be even very irrational, thus needing some partly random stimulus from the GUI, which is not offer by a purely static GUI. The GUI is also very suitable for any advertising purposes because advertisements can act like rest of the fluid objects, by having advertisement objects (e.g., such objects can be provided to the GUI from a remote server, for example, from service/product providers that the user has utilized) flow in and out of the display screen. Also, the user can provide feedback to such advertisements, for example, by actively voting on or rating such advertisements by kicking then out of the screen or accessing them. This co-operation and user control is a benefit for both user and advertiser.

The processes described herein for providing a fluid graphical user interface may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
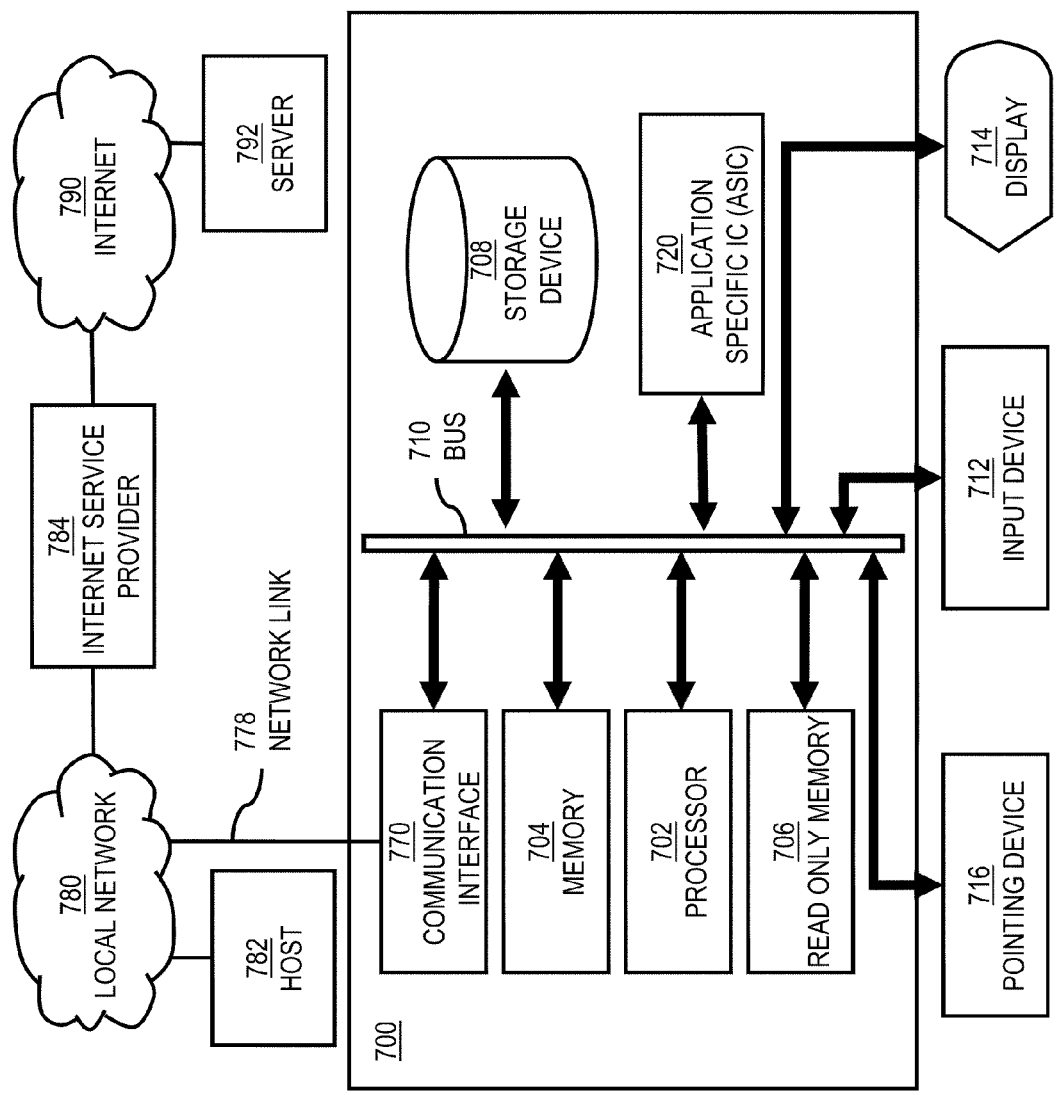
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide a fluid graphical user interface as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing a fluid graphical user interface.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to provide a fluid graphical user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing a fluid graphical user interface. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing a fluid graphical user interface, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing a fluid graphical user interface to the UEs 101A . . . 101N or UE 103.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
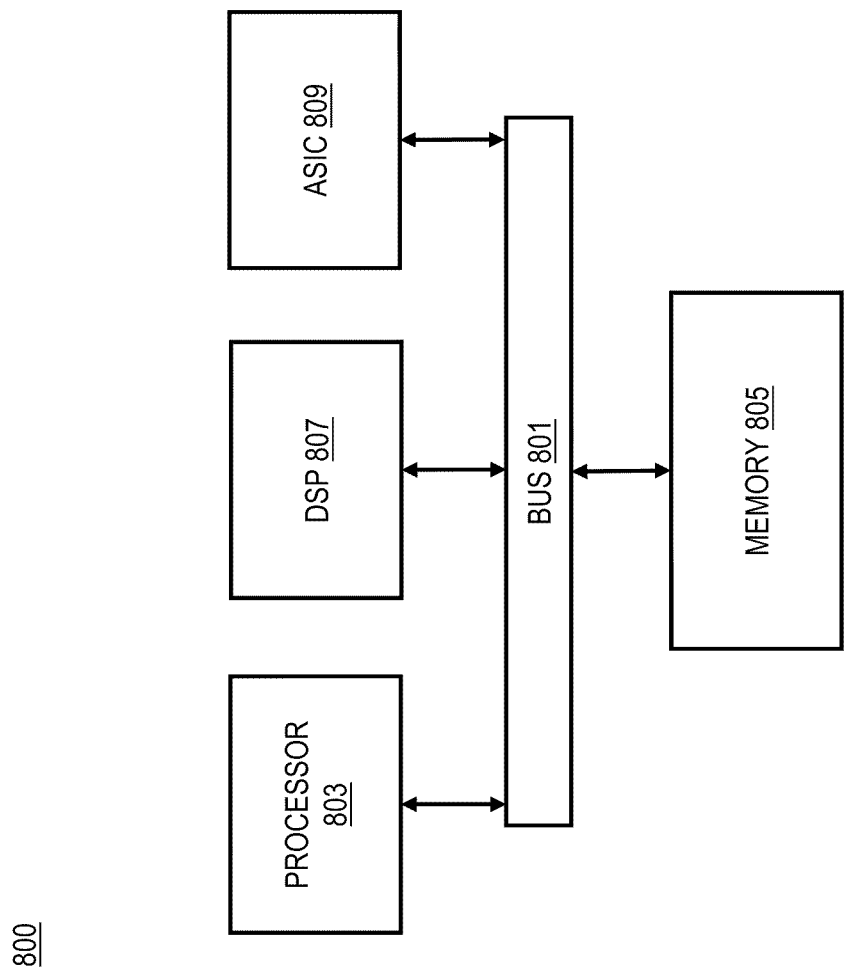
FIG. 8 is a diagram of a chip set that can be used to implement an embodiment of the invention.

FIG. 8 illustrates a chip set 800 upon which an embodiment of the invention may be implemented. Chip set 800 is programmed to provide a fluid graphical user interface as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of providing a fluid graphical user interface.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide a fluid graphical user interface. The memory 805 also stores the data associated with or generated by the execution of the inventive steps.

Figure 9:
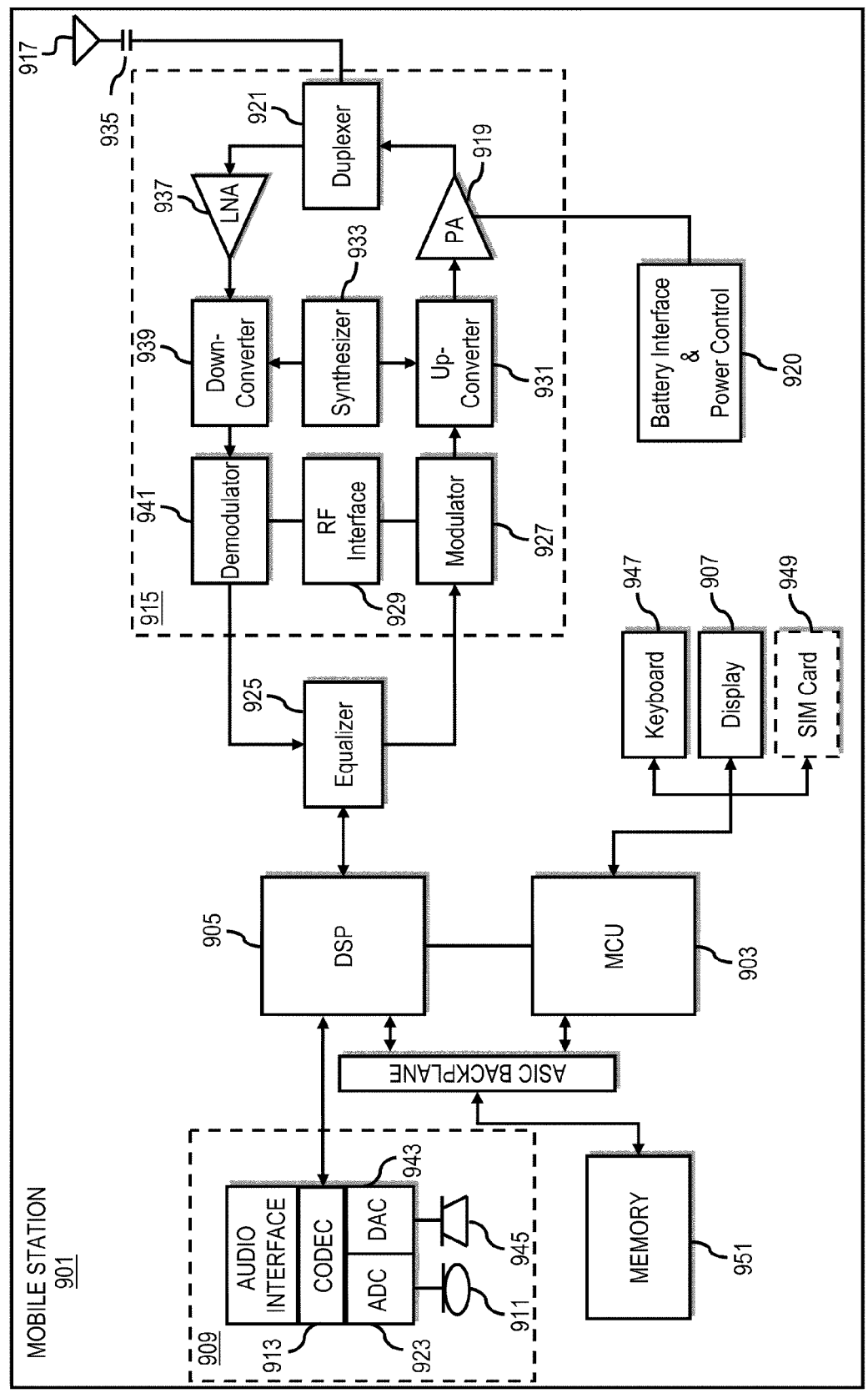
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of providing a fluid graphical user interface. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing a fluid graphical user interface. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide a fluid graphical user interface. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   causing, at least in part, display of selectable objects on a graphical user interface, wherein each of the selectable objects corresponds to data or an application accessible via the graphical user interface;
   causing, at least in part, display of the selectable objects in motion travelling across the graphical user interface based on a category of the selectable object or context dependent data; and
   allowing user selection and manipulation of the selectable objects displayed on the graphical user interface,
   wherein the user selection and manipulation includes allowing a user to select a first selectable object of the selectable objects, and remove the first selectable object from being displayed on the graphical user interface, and
   wherein the removed first selectable object is reduced in priority of display as compared to other selectable objects for subsequent display of the removed first selectable object.

2. A method of claim 1, wherein the user selection and manipulation includes allowing a user to select a second selectable object of the selectable objects, and to move the second selectable object to an area on the graphical user interface for use as a first category, said method further comprising:
   causing, at least in part, display of categorized selectable objects in motion travelling across the graphical user interface that have a relation to the first category of the second selectable object.

3. A method of claim 1,
   wherein the user selection and manipulation includes allowing a user to select a second selectable object of the selectable objects, and to fix the second selectable object at a location on the graphical user interface, and
   wherein the user selection and manipulation further includes allowing the user:
      to activate media playback of the second selectable object; or
      to activate an editor or a viewer associated with the second selectable object.

4. A method of claim 1,
   wherein the user selection and manipulation includes allowing a user to select a second selectable object of the selectable objects, and to associate the second selectable object with a third selectable object of the selectable objects, and
   further comprising causing, at least in part, display of the associated second selectable object and third selectable object in motion travelling across the graphical user interface together.

5. A method of claim 1, wherein the graphical user interface is provided on a mobile device, and wherein the selectable objects are caused to be displayed in motion by appearing at a first respective side of the graphical user interface, travelling across the graphical user interface, and then disappearing at a second respective side of the graphical user interface, said method further comprising:
allowing user setting of the motion of the selectable objects including speed of travel, direction of travel, and number of selectable objects that are caused to be displayed simultaneously.

6. A method of claim 1, wherein the manipulation of the selectable objects displayed on the graphical user interface is defined by action of the user selection and/or by a function of metadata linked to a respective selectable object.

7. An apparatus comprising:
at least one processor; and
at least one memory including computer program code,
the at least one memory and the computer program code configured to, with the at least one processor, cause the apparatus to perform at least the following:
cause, at least in part, display of selectable objects on a graphical user interface, wherein each of the selectable objects corresponds to data or an application accessible via the graphical user interface;
cause, at least in part, display of the selectable objects in motion travelling across the graphical user interface based on a category of the selectable object or context dependent data; and
allow user selection and manipulation of the selectable objects displayed on the graphical user interface,
wherein the user selection and manipulation includes allowing a user to select a first selectable object of the selectable objects, and remove the first selectable object from being displayed on the graphical user interface, and
wherein the removed first selectable object is reduced in priority of display as compared to other selectable objects for subsequent display of the removed first selectable object.

8. An apparatus of claim 7, wherein the user selection and manipulation includes allowing a user to select a second selectable object of the selectable objects, and to move the second selectable object to an area on the graphical user interface for use as a first category, and wherein the apparatus is further caused, at least in part, to:
display categorized selectable objects in motion travelling across the graphical user interface that have a relation to the first category of the second selectable object.

9. An apparatus of claim 7,
wherein the user selection and manipulation includes allowing a user to select a second selectable object of the selectable objects, and to fix the second selectable object at a location on the graphical user interface, and
wherein the user selection and manipulation further includes:
allowing the user to activate media playback of the second selectable object, or
allowing the user to activate an editor or a viewer associated with the second selectable object.

10. An apparatus of claim 7,
wherein the user selection and manipulation includes allowing a user to select a second selectable object of the selectable objects, and to associate the second selectable object with a third selectable object of the selectable objects, and
wherein the apparatus is further caused, at least in part, to display the associated second selectable object and third selectable object in motion travelling across the graphical user interface together.

11. An apparatus of claim 7, wherein the apparatus is a mobile device and wherein the selectable objects are caused to be displayed in motion by appearing at a first respective side of the graphical user interface, travelling across the graphical user interface, and then disappearing at a second respective side of the graphical user interface, and wherein the apparatus is further caused, at least in part, to:
allow user setting of the motion of the selectable objects including speed of travel, direction of travel, and number of selectable objects that are caused to be displayed simultaneously.

12. An apparatus of claim 7, wherein the manipulation of the selectable objects displayed on the graphical user interface is defined by action of the user selection and/or by a function of metadata linked to a respective selectable object.

13. A computer-readable storage medium carrying one or more sequences of one or more instructions which, when executed by one or more processors, cause an apparatus to at least perform the following steps:
causing, at least in part, display of selectable objects on a graphical user interface, wherein each of the selectable objects corresponds to data or an application accessible via the graphical user interface;
causing, at least in part, display of the selectable objects in motion travelling across the graphical user interface based on a category of the selectable object or context dependent data; and
allowing user selection and manipulation of the selectable objects displayed on the graphical user interface,
wherein the user selection and manipulation includes allowing a user to select a first selectable object of the selectable objects, and remove the first selectable object from being displayed on the graphical user interface, and
wherein the removed first selectable object is reduced in priority of display as compared to other selectable objects for subsequent display of the removed first selectable object.

14. A computer-readable storage medium of claim 13, wherein the user selection and manipulation includes allowing a user to select a second selectable object of the selectable objects, and to move the second selectable object to an area on the graphical user interface for use as a first category, and wherein the apparatus is further caused, at least in part, to:
display categorized selectable objects in motion travelling across the graphical user interface that have a relation to the first category of the second selectable object.

15. A computer-readable storage medium of claim 13,
wherein the user selection and manipulation includes allowing a user to select a second selectable object of the selectable objects, and to fix the second selectable object at a location on the graphical user interface, and
wherein the user selection and manipulation further includes allowing the user:
to activate media playback of the second selectable object; or
to activate an editor or a viewer associated with the second selectable object.

16. A computer-readable storage medium of claim 13, wherein the apparatus is a mobile device, wherein the selectable objects are caused to be displayed in motion travelling across the graphical user interface based on context data of the mobile device, and wherein user selection and manipulation of the selectable objects displayed on the graphical user interface allows for control of the motion of one or more of the selectable objects.

17. A computer-readable storage medium of claim 13, wherein the manipulation of the selectable objects displayed on the graphical user interface is defined by action of the user selection and/or by a function of metadata linked to a respective selectable object.

* * * * *